Sept. 6, 1960 J. BAILEY 2,951,264
METHOD OF MANUFACTURING MULTICAVITY SQUEEZE BOTTLES
Filed Sept. 27, 1957 2 Sheets-Sheet 1

INVENTOR
JAMES BAILEY
BY Bates & Willard
ATTORNEYS

Sept. 6, 1960          J. BAILEY          2,951,264
METHOD OF MANUFACTURING MULTICAVITY SQUEEZE BOTTLES
Filed Sept. 27, 1957          2 Sheets-Sheet 2
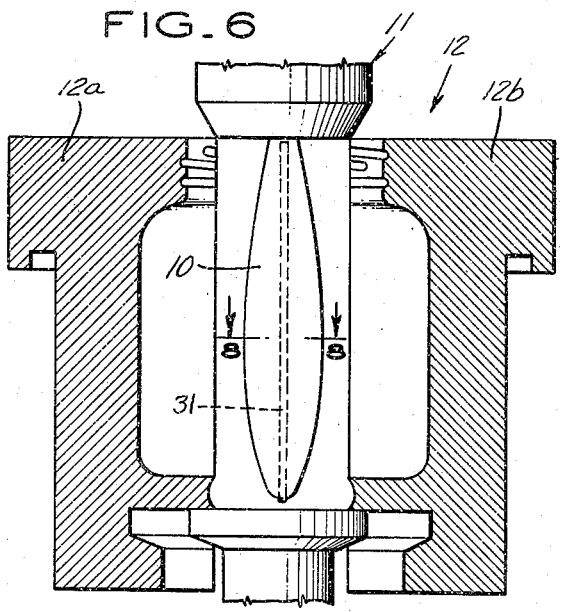
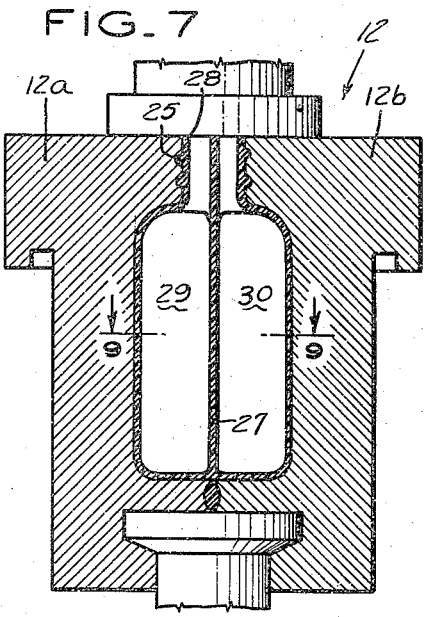
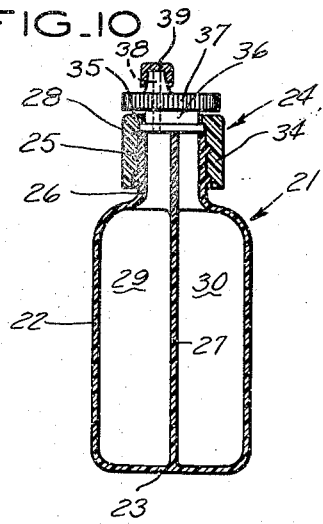
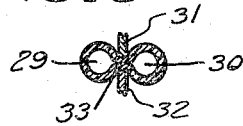
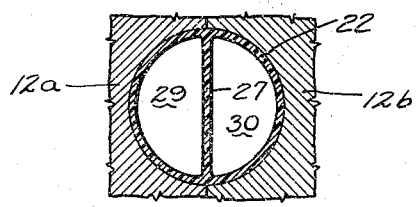
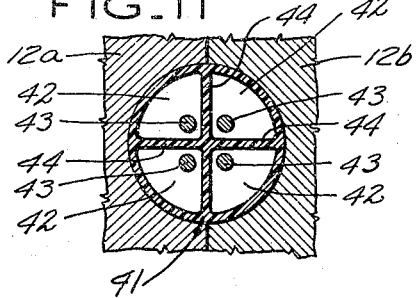
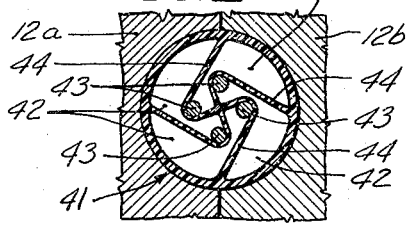
INVENTOR
JAMES BAILEY
BY Bates & Willard
ATTORNEYS

United States Patent Office 2,951,264
Patented Sept. 6, 1960

2,951,264

METHOD OF MANUFACTURING MULTICAVITY SQUEEZE BOTTLES

James Bailey, West Hartford, Conn., assignor to Plax Corporation, Bloomfield, Conn., a corporation of Delaware Filed Sept. 27, 1957, Ser. No. 686,658

5 Claims. (Cl. 18—55)

This invention relates to production of bottles and more particularly to the production of compartmented bottles having one or more internal walls which divide the interior of the bottle into a plurality of separate wells or reservoirs. As an example, ink bottles having a pocket on one side near the top have been produced in glass for several years. Such a pocket also is provided in the plastic squeeze bottle spray dispenser that is illustrated and described in U.S. Patent No. 2,583,821.

It is an object of this invention to provide improved methods and apparatus for making bottles having internal walls and compartments of the character described.

A further object is to provide improved method and apparatus for blow-molding multiple cavity plastic squeeze bottles from extruded tubing.

Still another object is to provide an improved multi-cavity squeeze bottle in which the internal partitions are disposed so as to facilitate squeeze dispensing of the contents with a minimum of resistance by the partitions.

A still further object is to provide improved method and apparatus for manufacturing the multicavity bottle above.

The manner in which these and other advantages are accomplished or obtained is pointed out or is apparent in the detailed description that follows and which has reference to the accompanying drawings in which:

Fig. 6 is a cross-sectional view similar to Fig. 1 showing a modification of the tube pinching operation embodying the invention;

Fig. 7 is a cross-sectional view of a plastic bottle blown in a closed mold from the pinched tube of Fig. 6;

Fig. 8 is a cross-sectional view of the pinched tube taken on line 8—8 of Fig. 6;

Fig. 9 is a cross-sectional view of the compartmented bottle taken on line 9—9 of Fig. 7;

Fig. 10 is a cross-sectional view of the bottle shown in Figs. 7 and 9 with closure and dispensing fitments applied thereto; and Figs. 11 and 12 are cross-sectional views similar to Fig. 9 of a four compartment bottle and illustrating the operation of reshaping and relocating internal walls of the bottle.

Figure 5:
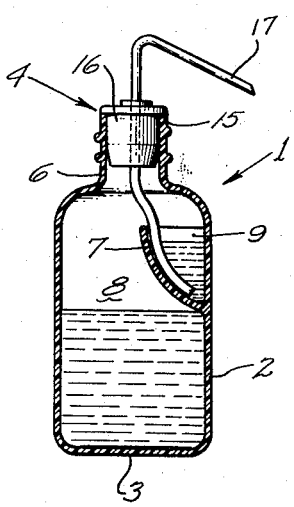
Fig. 5 is a cross-sectional view of the compartmented bottle of Fig. 2 with liquid content and dispensing fitments.

Referring to Fig. 5, the dispenser there shown includes a plastic squeeze bottle, generally designated 1, having conventional side walls 2 and integral bottom 3, together with a closure and dispensing fitment, generally designated 4, which is removably secured by a friction fit in the neck 6 of the bottle 1.

The illustrated bottle 1 may be blow molded of a resilient plastic material, such as polyethylene, although other material may be employed in its manufacture. If desired, the closure and dispensing fitment 4 may be molded or otherwise manufactured of the same or a more rigid material.

In accordance with the present invention, the bottle 1 has an internal wall 7 which with the side wall 2 divides the bottle 1 into a main compartment or reservoir 8 and a smaller cup or reservoir 9 which is located upwardly on the side wall 2.

Figure 1:
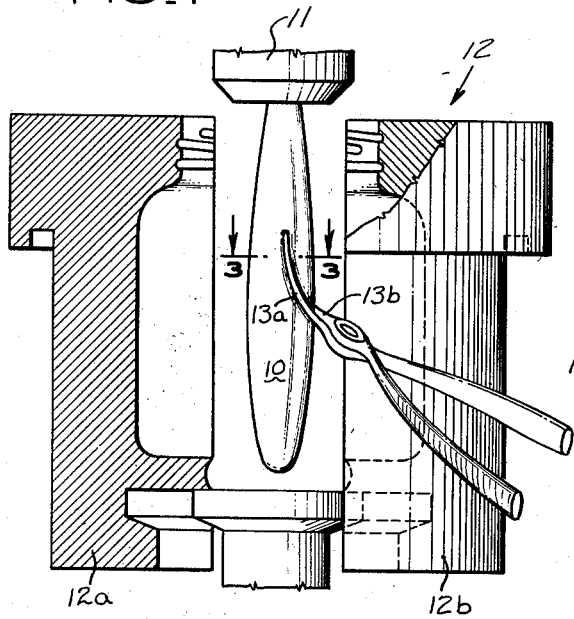
Fig. 1 is an elevation view partly in cross-section showing a tube pinching operation in the blow molding of a multi-cavity bottle from a plastic tube in accordance with the present invention.

In manufacturing the bottle 1 pursuant to the present invention, a length of hollow tubular plastic 10 is extruded, as shown in Fig. 1, from an extrusion nozzle 11 between the open halves 12a and 12b of a blow mold generally designated 12. Prior to closing the mold halves 12a and 12b, as in Fig. 2, the plastic tube 10 is pinched together, as by fingers 13a and 13b, along a line which extends in a generally longitudinal direction relative to the tube. In accordance with the invention, the pinch line intersects a wall of the bottle 1 at a point lower than the upper extremity of the pinch which is located at a point spaced from the bottle walls. The intersected bottle wall may be either the bottom 3 or the side wall 2, as in Fig. 1.

Figure 2:
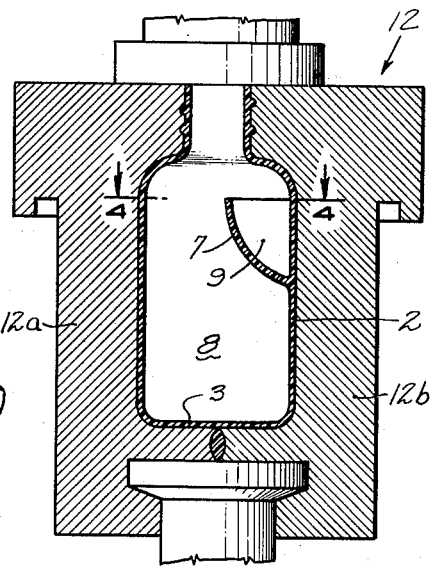
Fig. 2 is a cross-sectional view showing a bottle blow molded from the tube of Fig. 1.
Figure 3:
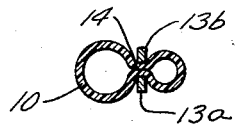
Fig. 3 is a cross-sectional view taken on line 3—3 of Fig. 1 showing the tube divided and partitioned in accordance with the invention.
Figure 4:
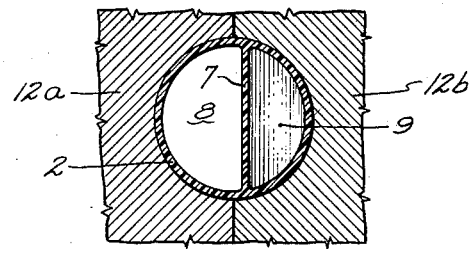
Fig. 4 is a cross-sectional view taken on line 4—4 of Fig. 2 showing the dual chambers in the blown bottle.

As shown in Fig. 3, the pinch welds or otherwise permanently unites the tubular plastic along the pinch line 14 so that when the mold halves 12a and 12b are closed the tube 10 may be blow molded into the compartmented bottle 1 shown in Fig. 2 with the welded pinch line forming the internal wall which divides the bottle into the two separate reservoirs or compartments 8 and 9, both of which are open to the throat or neck 6 of the bottle. As the tube or parison 10 is expanded by the blow molding air, or other fluid medium, the plastic material along or adjacent the weld line 14 is stretched to form the web wall 7, which with the intersecting side wall 2 provides the well separated from the main cavity or reservoir 8 within the bottle.

When the lip 15 of the bottle is trimmed, a suitable fitment, such as flanged plug 16, may be seated snugly in the neck 6 of the bottle 1, as shown in Fig. 5. As illustrative of suitable fitments, a discharge tube 17 extends from within the well 9 through the plug 16.

The well 9 may be filled with liquid from the main reservoir 8 by tilting the bottle, and thereafter the measured content of the well discharged through the tube 17 by manually squeezing the bottle 1.

It will be understood that while a stream discharge filament is illustrated, if desired the plug 16 may be designed for an atomizing spray or mist discharge, or otherwise altered for a variety of uses.

Referring to Fig. 10, the dispenser there shown includes a plastic squeeze bottle, generally designated 21, having conventional side walls 22 and integral bottom 23, together with a closure and dispensing fitment, generally designated 24, which is removably secured as by screw threads 25 on the neck 26 of the bottle.

The illustrated bottle 21 differs from the bottle 1 of Fig. 5 in that internal wall 27 intersects the bottom 23 rather than the side wall 22 of the bottle and extends upwardly to the plane of the bottle lip 28 so as to divide the bottle interior into two identical wells or reservoirs 29 and 30.

In manufacturing the bottle 21 pursuant to the present invention, a length of hollow tubular plastic 10 is extruded, as shown in Fig. 6, from the extrusion nozzle 11 between the open halves 12a and 12b of the blow mold 12. Prior to closing the mold halves 12a and 12b, as in Fig. 7, the plastic tube 10 is pinched together, as by the opposing edges of plates 31 and 32, along a line which extends longitudinally all the way from the bottom to the top of the mold cavity.

As shown in Fig. 8, the pinch welds or otherwise permanently unites the tubular plastic along the pinch line 33 so that when the mold halves 12a and 12b are closed the tube 10 may be blow molded into the compartmented bottle 21, shown in Fig. 10, with the welded pinch line forming the internal wall 27 which divides the bottle into the two separate reservoirs or compartments 29 and 30, both of which open through the throat or neck 26 of the bottle. As the tube or parison 10 is expanded by the blow molding air, or other fluid medium, the plastic material along the weld line 33 is stretched to form the web wall 27, which with the side wall 22 and the bottom 23 provides the two cavities or reservoirs 29 and 30 within the bottle.

When the lip 28 and top of the wall 27 are trimmed, a suitable fitment such as that designated 24 in Fig. 10 may be attached to the bottle 21.

The fitment 24 there shown includes a flanged clamping skirt 34 removably secured by the threads 25 to the neck of the bottle and having a flange 35 which adjustably secures flanged cap 36 to the lip 28 of the bottle. A serrated disc portion 37 provides for manually rotating the disc 36 to selectively align discharge passageway 38 with either of the reservoirs 29 and 30 when the clamping skirt 34 is loosened on the bottle neck. Thereafter, the member 34 may be tightened and the contents discharged through the passage 38 from either well 29 or 30 selected. Thus, the bottle 21 may be used to hold and selectively discharge two different materials. A removable sealing cap 39 of course may be provided for the passage 38.

It will be understood that while a stream discharge fitment 24 is illustrated, if desired the fitment may provide an atomizing spray or mist discharge from either or both reservoirs 29 and 30, as well as stream or drop discharge or any combination thereof.

Figs. 11 and 12 show a bottle 41 having four separate cavities or wells 42, it being understood that the bottles shown are merely illustrative and that as many cavities as desired can be formed.

As shown in Fig. 11, individual rods 43 have been inserted through the neck of the bottle into each well 42 and, as shown in Fig. 12, rotate about the axis of the bottle while the plastic is still soft and under blowing pressure within the mold so that the partitions 44 are stretched and reshaped, as shown in Fig. 12. When cooled and set in the shape there shown, the partitions 44 are more readily yieldable to dispensing squeeze pressure on the bottle than when in the shape shown in Fig. 11, and it is possible to retain the squeeze bottle effect in each cavity.

The spacing of the rods 43 is limited by the size of the bottle neck through which they are inserted and the ends of the rods must be spaced somewhat from the bottom of the bottle so as to provide room for the partitions to twist to the position shown in Fig. 12 and still remain anchored in the position shown in Fig. 11 at the bottom of the bottle.

Many modifications of the invention will occur to those skilled in the plastic squeeze bottle art. For example, the parison can be twisted after pinching and before blowing to provide spiral shaped cavities.

One or more minor wells or cavities, such as 9 in Fig. 5, may be provided in one or more main cavities, such as 8 of Fig. 5; 29, 30 of Fig. 10 and 42 of Figs. 11 and 12.

Discontinuities in the jaws 31, 32 provide openings in the partition wall which are useful in reducing the effect of impact and in promoting mixing of content when the bottle is squeezed.

Other modifications also will be apparent and the scope of the invention accordingly is defined by the appended claims of the described embodiments are merely illustrative.

I claim:
1. The method of forming multicavity plastic squeeze bottles which comprises extruding tubing of plastic, pinching and welding said tubing along a line located generally longitudinally of the tubing, and blow molding said pinched tubing within a blow mold cavity with the end of said tubing closed to form a bottle, said pinch line intersecting the mold cavity wall with an internal wall extending across and intersecting a wall portion of the bottle molded against said mold cavity wall.

2. The method recited in claim 1 and wherein the molded bottle wall intersected by the internal wall is the side wall of the bottle and is located out of alignment with the neck passageway of the bottle.

3. The method recited in claim 1 and wherein said wall of the bottle intersected by the internal wall is the bottom of the bottle opposite the neck opening therein.

4. The method recited in claim 3 and including reforming the internal wall while the bottle is held by fluid pressure in blow molding engagement with the mold cavity wall.

5. The method recited in claim 4 and wherein a portion of the internal wall while in a soft state is rotated relative to the outer wall of the bottle.

References Cited in the file of this patent
UNITED STATES PATENTS

| | | |
|---|---|---|
| 1,840,190 | Dyck | Jan. 5, 1932 |
| 1,867,154 | Hotchner | July 12, 1932 |
| 2,065,504 | Beck | Dec. 29, 1936 |
| 2,285,707 | Garwood et al. | June 9, 1942 |
| 2,329,136 | Poglein | Sept. 7, 1943 |
| 2,491,848 | Breadner et al. | Dec. 20, 1949 |
| 2,597,558 | Bailey | May 20, 1952 |
| 2,669,752 | Pratt | Feb. 23, 1954 |
| 2,728,491 | Aneshansley | Dec. 27, 1955 |